United States Patent [19]
Muroki et al.

[11] Patent Number: 6,011,906
[45] Date of Patent: *Jan. 4, 2000

[54] IMAGE SYSTEM IN WHICH A PARAMETER FOR CORRECTING IMAGE DATA READ OUT BY A SCANNER IS GENERATED AUTOMATICALLY TO SUIT A PRINTER

[75] Inventors: Kenichi Muroki, Yamaguchi-Ken; Shoji Imaizumi, Shinshiro; Keiji Kusumoto, Toyokawa, all of Japan

[73] Assignee: Minolta Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/558,039

[22] Filed: Nov. 13, 1995

Related U.S. Application Data

[63] Continuation of application No. 08/057,977, May 5, 1993, abandoned.

[30] Foreign Application Priority Data

May 10, 1992 [JP] Japan ................................. 4-143357

[51] Int. Cl.[7] .................................................. H04N 1/04
[52] U.S. Cl. ........................... 395/109; 358/406; 358/504
[58] Field of Search ................................. 358/406, 474, 358/475, 504, 505, 518, 501, 442, 473, 461; 382/312, 313; 395/114, 109; H04N 1/04, 1/40

[56] References Cited

U.S. PATENT DOCUMENTS

| | | |
|---|---|---|
| 4,724,330 | 2/1988 | Tubro ..................................... 250/578 |
| 4,941,038 | 7/1990 | Walowit ................................... 358/80 |
| 5,099,341 | 3/1992 | Nosaki et al. .......................... 358/461 |
| 5,124,813 | 6/1992 | Minowa et al. ........................ 358/442 |
| 5,170,267 | 12/1992 | Blitz et al. ............................. 358/475 |
| 5,172,224 | 12/1992 | Collette et al. ........................ 358/406 |
| 5,173,783 | 12/1992 | Oku et al. .............................. 358/406 |
| 5,175,633 | 12/1992 | Saito et al. ............................. 350/406 |
| 5,181,124 | 1/1993 | Close et al. ............................ 358/406 |
| 5,185,673 | 2/1993 | Sobol ..................................... 358/406 |
| 5,198,907 | 3/1993 | Walker et al. ......................... 358/406 |
| 5,202,773 | 4/1993 | Kato ...................................... 358/406 |
| 5,210,600 | 5/1993 | Hirata .................................... 358/406 |
| 5,214,518 | 5/1993 | Kato ...................................... 358/406 |
| 5,223,951 | 6/1993 | Umakoshi .............................. 358/406 |
| 5,255,085 | 10/1993 | Spence ................................... 358/406 |
| 5,267,049 | 11/1993 | Yamamoto ............................. 358/406 |
| 5,309,256 | 5/1994 | Takada et al. ......................... 358/504 |
| 5,452,111 | 9/1995 | Giorgianni et al. ................... 358/504 |
| 5,646,749 | 7/1997 | Omi et al. .............................. 358/501 |

*Primary Examiner*—Kim Yen Vu
*Attorney, Agent, or Firm*—Sidley & Austin

[57] ABSTRACT

A film scanner for generating output image data by applying a correction process referring to a predetermined parameter to the read out image data generated by scanning an original is connected to a digital color printer. When an adjustment mode is specified in the film scanner, the reference output image data generated based on scanning a reference original by a printer is fed to the film scanner to be set as the target data. Based on read out image data generated by scanning a reference original having characteristics identical to those of a reference original, a parameter is calculated to be set for a correction process so that output image data matching the reference data is generated.

10 Claims, 7 Drawing Sheets

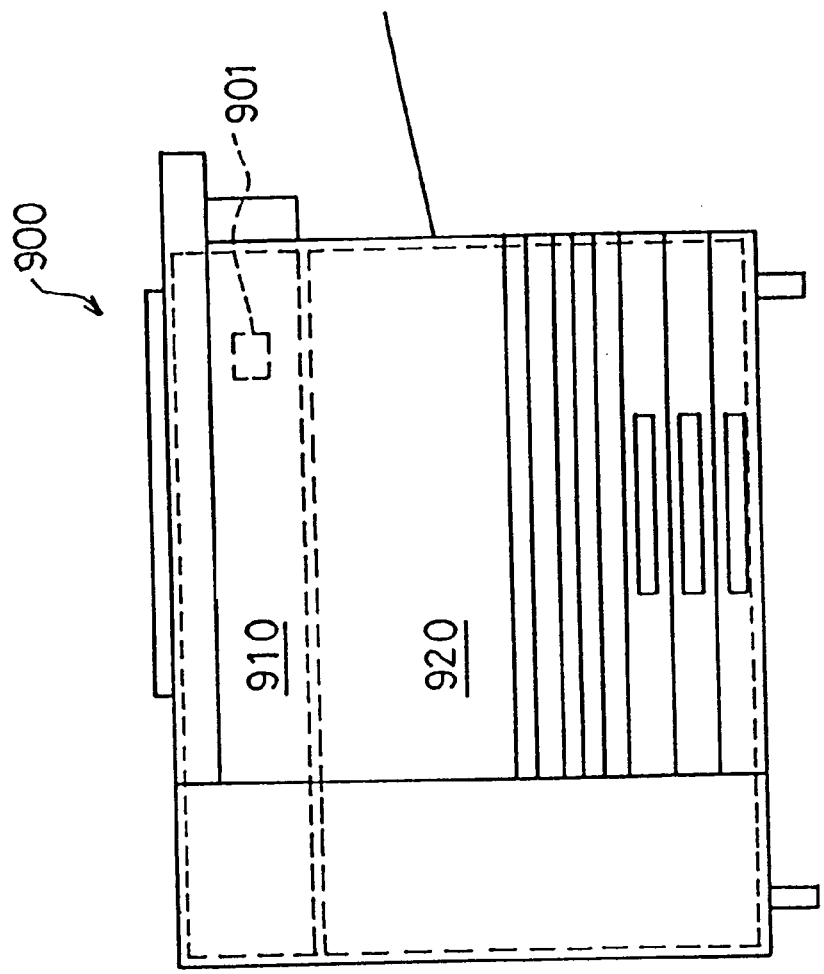
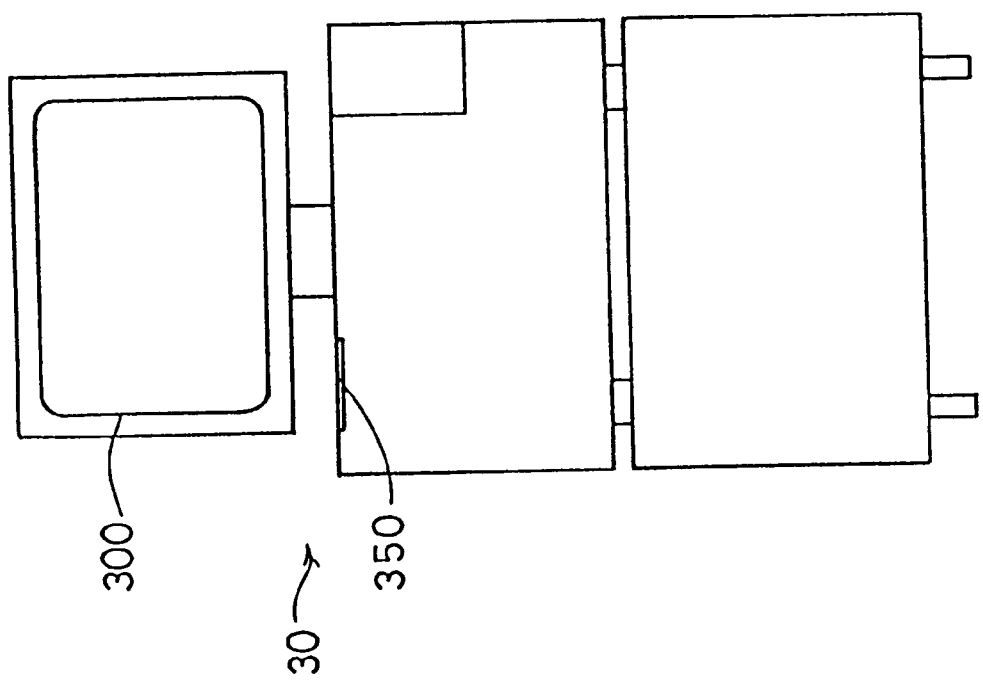
FIG. 4

IMAGE SYSTEM IN WHICH A PARAMETER FOR CORRECTING IMAGE DATA READ OUT BY A SCANNER IS GENERATED AUTOMATICALLY TO SUIT A PRINTER

This application is a continuation-in-part, of application Ser. No. 08/057,977, filed May 5, 1993, now abandoned.

BACKGROUND OF THE INVENTION

1. Field of the Invention

The present invention relates to image systems, and more particularly, to an image system for adjusting calibration process parameters (parameters for masking, γ correction and the like) of an image reading apparatus.

2. Description of the Related Art

An image reading apparatus without printing means such as an apparatus for reading out a film image for display on a CRT display is provided incorporating a connection mechanism for a separate printer.

A digital color copying apparatus that scans and read out an original image, applies a predetermined process, and reproduces the image as a color image is provided that can be connected with an externally provided image reading apparatus.

In order to connect an externally provided image reading apparatus to a digital color copying machine for transmitting a read out image by the externally provided apparatus to the copying machine for print out, a parameter calibration of the externally provided apparatus must be conducted so as to suit the copying machine to be connected. The parameters mentioned above include parameters such as masking, γ correction and the like.

A method of adjusting masking coefficients in a digital color copying machine is disclosed in Japanese Patent Laying-Open No. 57-133452, for example. According to this method, an image corresponding to reference color signals is recorded on a paper, whereby this image is scanned and read out to generate color separation signals. The values of a masking coefficient are calculated from the color separation signals and the reference color signal.

This method is applicable to an apparatus in which the reading means and the printing means are provided integrally. However, it is difficult to apply this method to an externally provided image reading apparatus that does not incorporate printing means.

SUMMARY OF THE INVENTION

An object of the present invention is to prevent reduction in the image quality by connection between a scanner and a printer.

Another object of the present invention is to improve the quality of an output image of a printer in connection with a scanner.

A further object of the present invention is to easily adapt image data read out by a scanner to the output characteristics of a printer in connection with a scanner.

An image system according to the present invention for achieving the above objects includes a scanner for scanning an original image to generate image data, and a printer that can be connected to a scanner for forming an image on a sheet of paper according to image data transmitted from the scanner. The printer includes a memory for storing first reference data for reproducing a reference image, and transmitting means for transmitting the first reference data in the memory to the scanner. The scanner includes reference scanning means for scanning the reference image for obtaining second reference data, and generating means for generating correction data for correcting the second reference data to become the first reference data received from the transmitting means.

The image system of the above-described structure has correction data generated so that the second reference data becomes the first reference data received from the transmitting means, so that deterioration in the picture quality due to connection between a scanner and printer can be prevented.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a front view of a system formed of a film scanner apparatus and a digital color copying machine.

DESCRIPTION OF THE PREFERRED EMBODIMENTS

Figure 1:
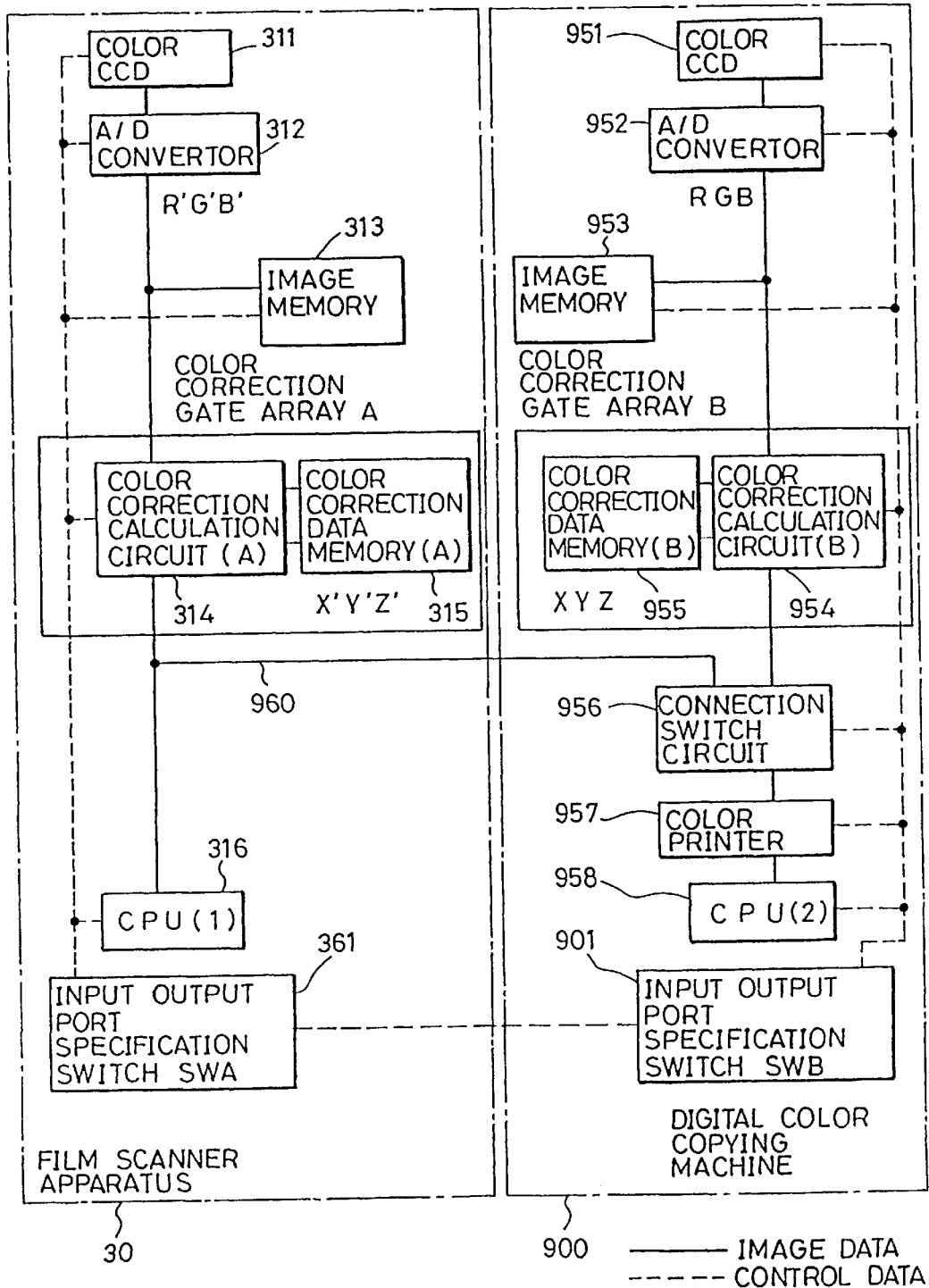
FIG. 1 is a block diagram of a circuit structure concerning masking of a film scanner apparatus and a digital color copying machine according to an embodiment of the present invention.

An embodiment of the present invention will be described hereinafter with reference to the drawings.

(1) System configuration

FIG. 4 shows the front view of the present system. The present system includes a film scanner apparatus 30, and a digital color copying machine 900 connected to film scanner apparatus 30.

Film scanner apparatus 30 reads out a set film original (transmission original) to display the same on a CRT display 300. When a print out is instructed by operation input, the image data is transmitted to the digital color copying apparatus 900 side, whereby the image is formed on a paper sheet. An operation panel 350 for operation input is provided at the top face of the main body of film scanner apparatus 30. The position for setting a film original is found at the front face of the main body of the apparatus.

Figure 8:
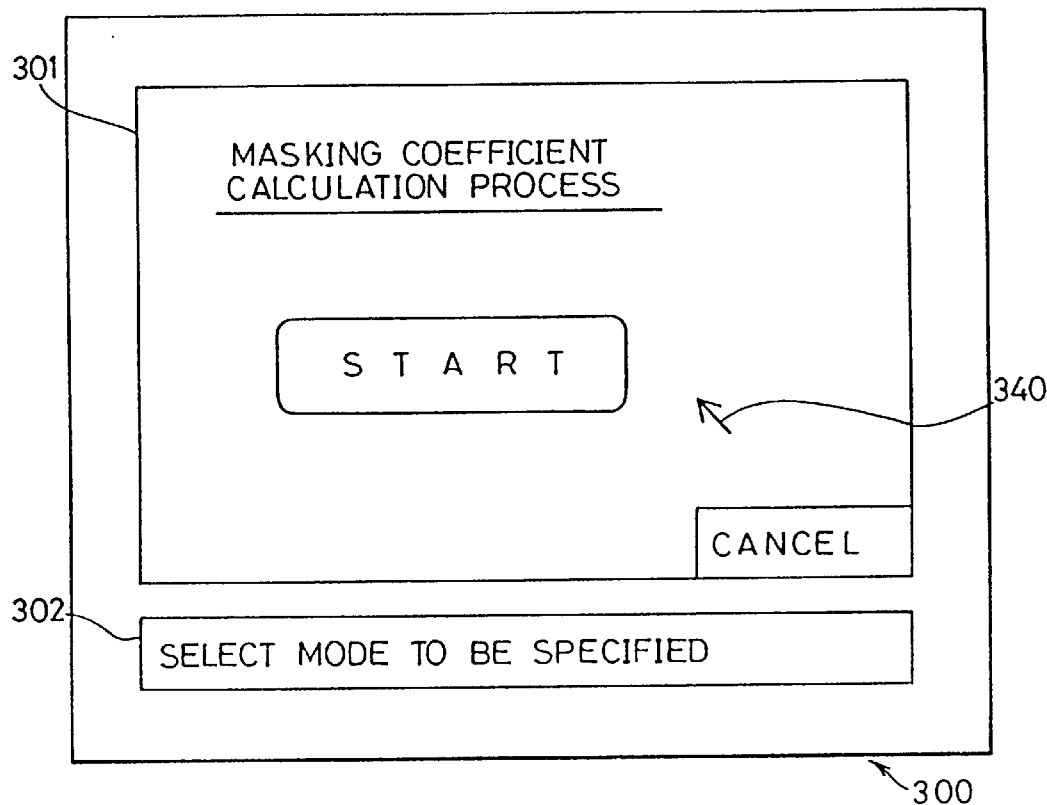
FIG. 8 shows the displayed contents of a CRT display of the film scanner apparatus of FIG. 4.

Referring to FIG. 8, CRT display 300 includes an image region 301 for displaying the read out image, a message region 302 for displaying various messages corresponding to the status of the apparatus and the like, and various switch regions (the switch region selected by the operation of a track ball input key 352) that is indicated as "START" and "CANCEL". The coordinates on display 300 is specified by a cursor 340.

Figure 9:
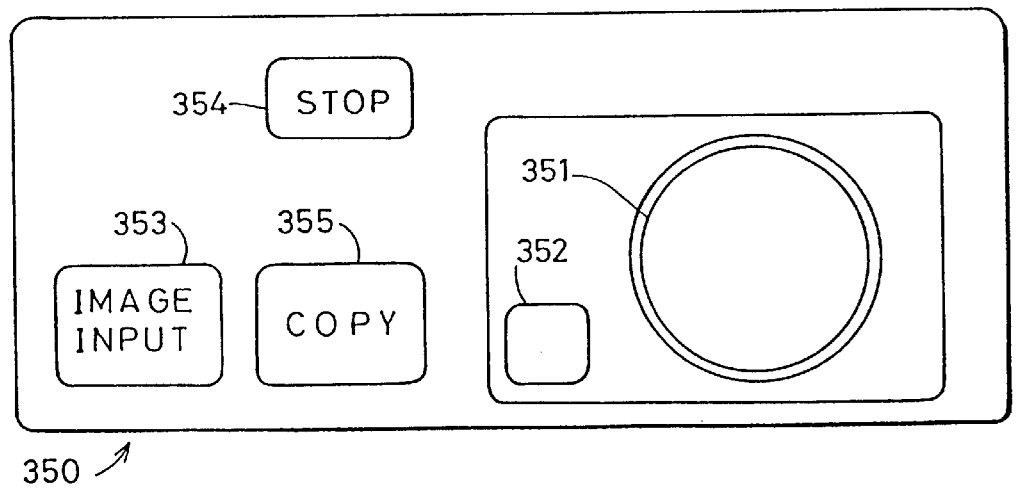
FIG. 9 shows the contents of the operation panel of the film scanner apparatus of FIG. 4.

Referring to FIG. 9, operation panel 350 includes a track ball 351 for moving the cursor position rotatably in an arbitrary direction by manual operation, a track ball input key 352 for entering the coordinate specified by the cursor, an image input key 353 for instructing read out operation of a film original, a copy key 355 for instruction such that the data generated by reading out a film original is provided to the side of the printer (digital color copying machine 900) for print out, and a stop key 354 for instructing an operation to be stopped.

Figure 7:
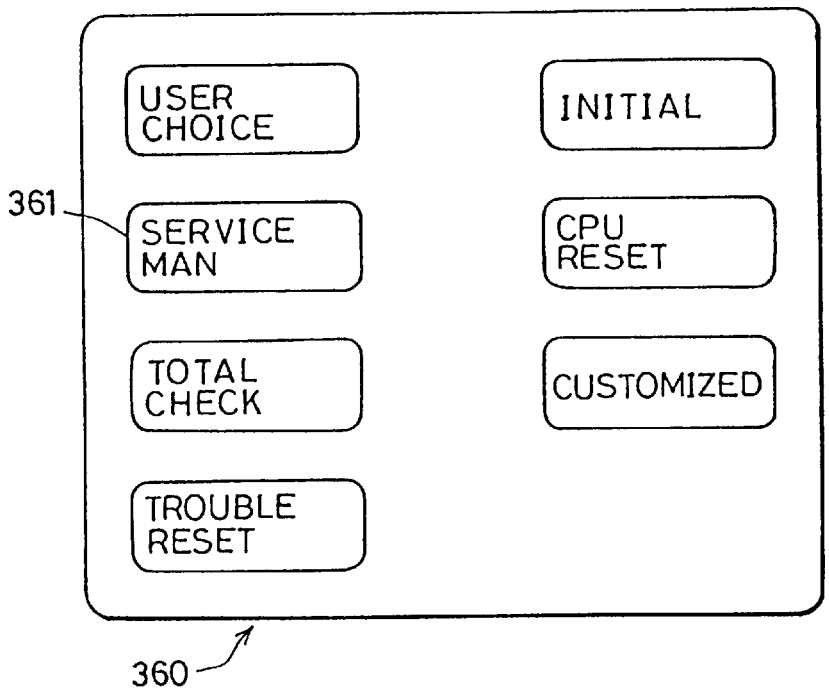
FIG. 7 shows an internal panel of the film scanner apparatus of FIG. 4.

An internal panel 360 that is normally stored within film scanner 30 is provided in addition to operation panel 350. Panel 360 is provided with a serviceman switch 361 (specification switch SWA in FIG. 1 for instructing specification of a serviceman mode as shown in FIG. 7.

Digital color copying machine 900 includes an image reader unit 910 for reading out a reflection type original image, and a printer unit 920 for reproducing an image on a paper sheet according to output image data transmitted from image reader unit 910. A serviceman switch 901 (specification switch SWB in FIG. 1) for instructing specification of a serviceman mode is provided inside the main body of digital color copying machine 900.

(2) Specification of masking coefficient

FIG. 1 shows a control circuit for specifying automatically the masking coefficient of film scanner apparatus 30 in the present system.

Referring to FIG. 1, film scanner apparatus 30 includes a color CCD 311 for reading out an original image, an A/D converter 312 for converting into digital data the image data read out by color CCD 311, an image memory 313 for storing the converted image data, a color correction gate array A for applying a masking process to the read out image data, a CPU (1) 316 for controlling the film scanner apparatus, and an input/output port specification switch (SWA) 361 for specifying an adjustment mode. Color correction gate array A includes a color correction calculation circuit (A) 314 for carrying out a masking process using a masking coefficient, and a color correction data memory (A) 315 for storing the data subjected to a masking process.

Digital color copying machine 900 includes a color CCD 951 for reading out an original image, an A/D converter 952 for converting the read out image data into digital signals, an image memory 953 for storing the converted image data, a color correction gate array B for applying a masking process to the read out image data, a connection switching circuit 956 for switching the connection between data subjected to a masking process by film scanner apparatus 30 and data subjected to masking process by digital color copying machine 900, a color printer 957 for providing image data subjected to a masking process, a CPU (2) 958 for controlling the digital color copying machine, and an input/output port specification switch (SWB) 901 for specifying an adjustment mode. Color correction gate array B includes a color correction calculation circuit (B) 955 for carrying out calculation by a masking coefficient similar to that of film scanner apparatus 30, and a color correction data memory (B) 954 for storing data subjected to a masking process.

In the present system, target value data (target value of output image data) according to a reference image is transmitted along signal path 960 from the digital color copying machine 900 side to the film scanner apparatus side 30, when a serviceman mode is specified in film scanner apparatus 30 instructing inverse calculation of a masking coefficient.

In film scanner apparatus 30, a reference original equal to that of the digital color copying machine 900 side is read out and a masking process is subjected to the resultant generated read out image data, whereby a masking coefficient is calculated and specified so that the data obtained by the masking process matches the above-mentioned target value data.

(2-1) Generation and storage of target value data X, Y, Z

In digital color copying machine 900, target value data X, Y, Z are generated in advance by reading out a reference original to be stored in color correction data memory (B)955.

The generation and storage of target value data X, Y, Z are set forth in the following.

By operating the serviceman switch SWB (901), a serviceman mode is specified. Then by predetermined operation, a read out mode of a reference original is specified.

When a reference original is set in image reader unit 910 and a read out operation is instructed, N sample regions in the reference original (coordinate data of the sample region is stored in the ROM in CPU 2) are read out, whereby each of color separation data R, G, B (read out image data) is generated.

Figure 2:
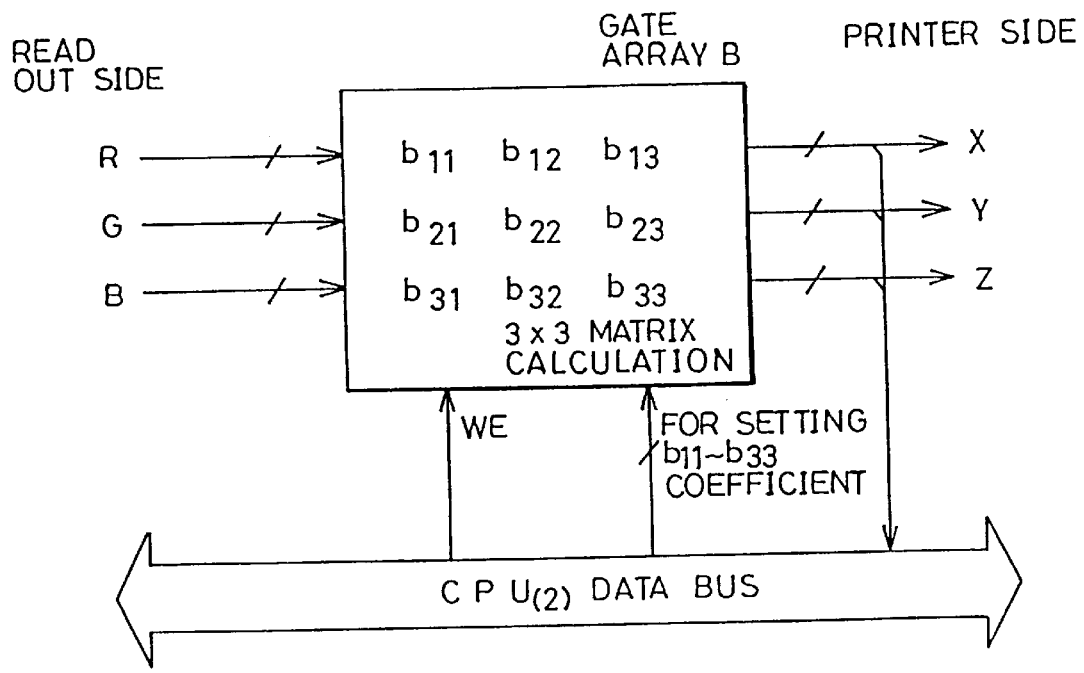
FIG. 2 is a block diagram showing the function of the color correction gate array B of FIG. 1.
Figure 3:
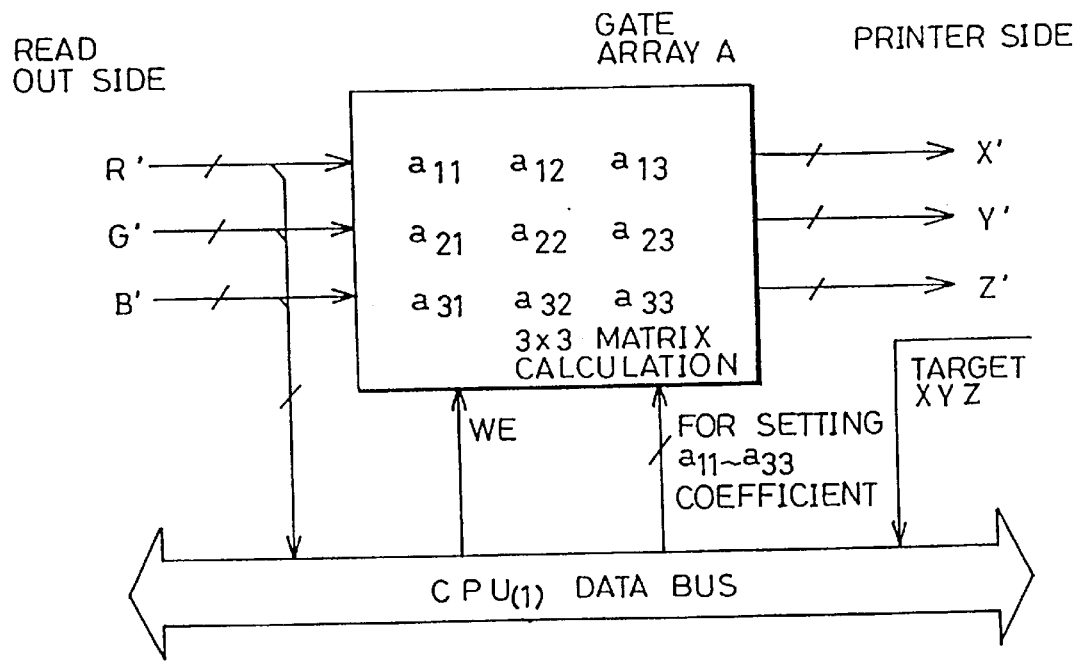
FIG. 3 is a block diagram showing the function of the color correction gate array A of FIG. 1.

These n color separation data R, G, B are subjected to a masking process by gate array B (refer to FIG. 2) and to be converted into n target value data X, Y, Z (output image data). The converted target data are stored in color correction data memory (B). It is assumed that a masking coefficient $(b_{ij})$ of gate array B is set to an appropriate value by CPU (2).

After target value data X, Y, Z are generated and stored, serviceman switch SWB (901) is operated again to cancel the serviceman mode.

The target value data X, Y, Z (output image data) can form a color image equivalent to the reference original on a paper sheet in printer unit 920 by being provided to printer unit 920.

(2-2) Inverse calculation and storage of masking coefficient $(a_{ij})$

Figure 5:
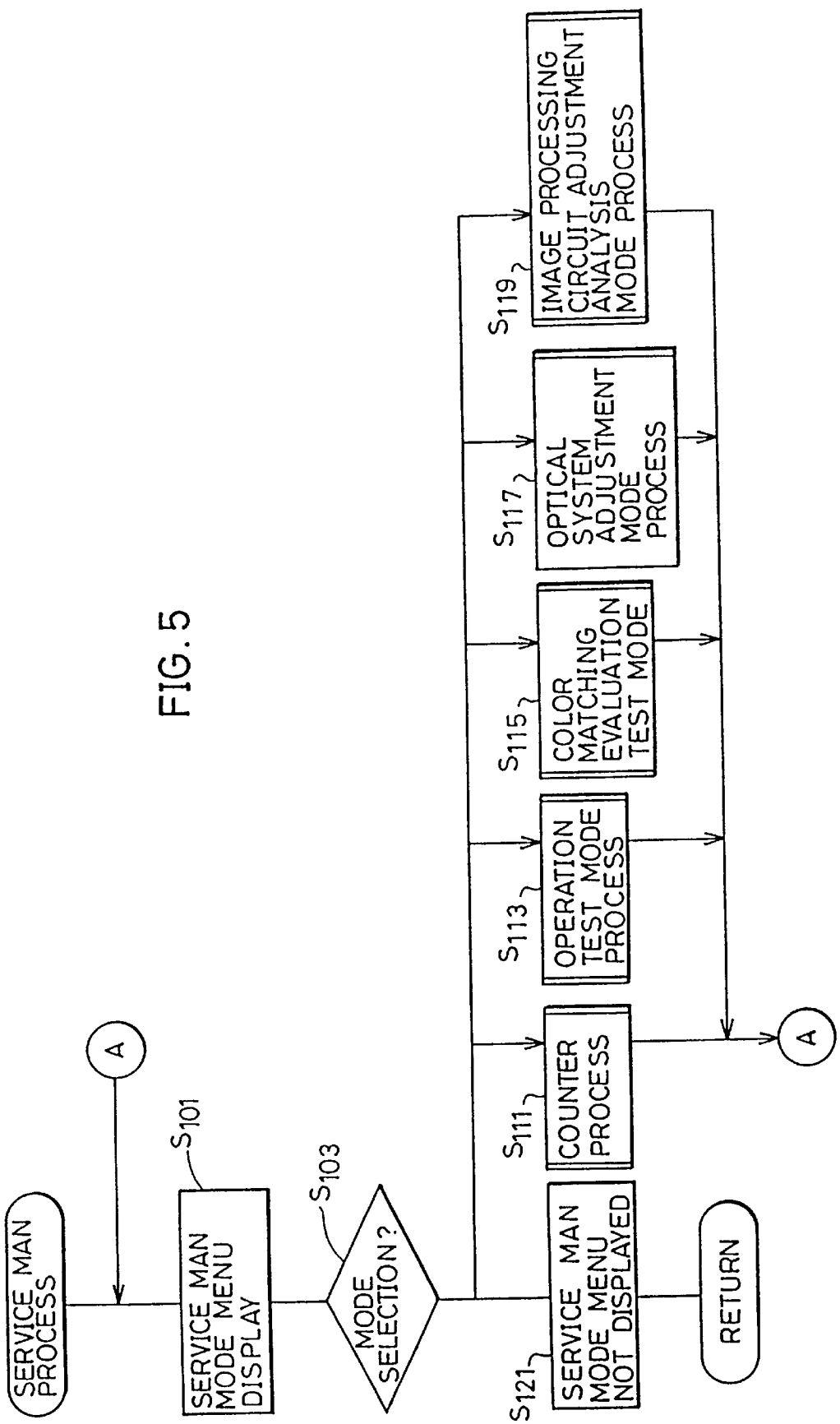
FIG. 5 is a flow chart showing the serviceman mode process executed by the CPU 1 of FIG. 1.

When serviceman switch SWA (361) of film scanner apparatus 30 is operated and a serviceman mode is specified, a serviceman mode menu is displayed on CRT display 300 (FIG. 5, step S101).

The displayed menu includes:

counter (display of various counters: S111);

operation test mode (carry out operation testing of components: S113);

color matching evaluation test mode (carrying out testing for color matching: S115);

optical system adjustment mode (carry out adjustment of optical system: S117);

image processing circuit adjustment analysis mode (carry out adjustment and analysis of image processing circuit: S119);

end (terminates the display of the serviceman mode menu: S121)

wherein the process in the parenthesis is executed by selection of the menu.

Figure 6:
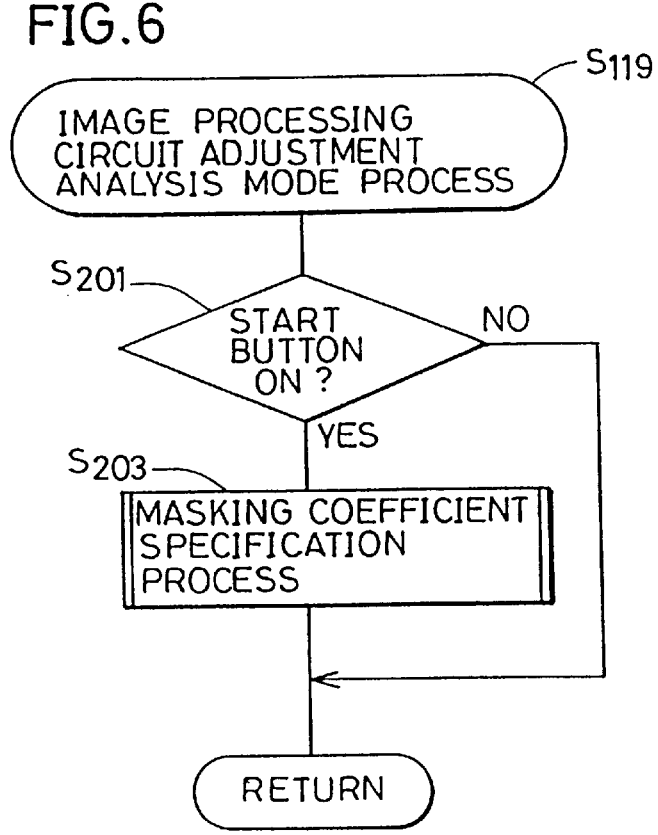
FIG. 6 is a flow chart specifically showing the contents of the image processing circuit adjustment analysis mode process routine of FIG. 5.
Figure 10:
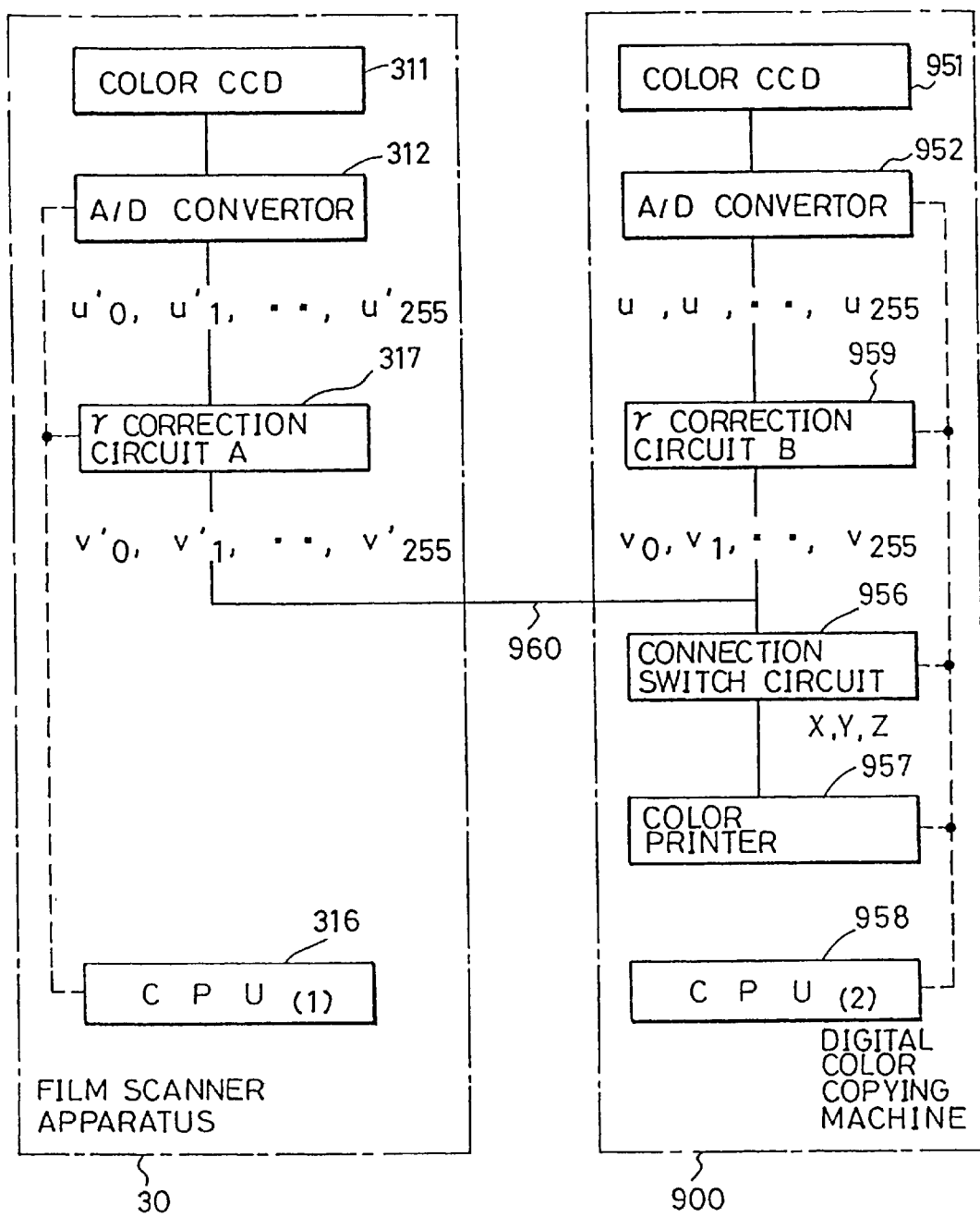
FIG. 10 is a block diagram showing the circuit structure relating to γ correction of the film scanner apparatus and the digital color copying machine according to the first embodiment of the present invention.

When "image processing circuit adjustment analysis mode" is selected, a sub-menu is displayed. This sub menu includes:

masking (carry out inverse calculation of masking coefficient: S203/FIG. 6);

γ correction (carry out inverse calculation of γ correction coefficient: FIG. 10); and the like. When "masking" is selected in the sub-menu, the display as shown in FIG. 8 appears. More specifically, waiting is conducted for the start switch to be depressed.

When a transmission type reference original (a transmission type reference original having color characteristics equal to that of the reflective type reference original used for the generation of target value data X, Y, Z at the digital color copying machine 900 side) is set at a predetermined film set position of film scanner apparatus 30, and "START" is selected in the display shown in FIG. 8, a masking coefficient specification process (FIG. 6, step S203) is executed.

First, n sample regions (sample regions equivalent to the sample regions read out at the time of generation of target value X, Y, Z) in the transmission type reference original are read out, whereby each color separation data R', G', B' (read out image data) is generated. These data are stored in color correction data memory A.

The connection switching circuit 956 is switched to the side of film scanner apparatus 30. The target value data X, Y, Z stored in color correction data memory B are transmitted along signal path 960 to film scanner apparatus 30 to be stored in color correction data memory (A).

In color correction calculation circuit A, a masking coefficient $[a_{ij}]$ is inverse-calculated from the n color separation data R', G', B' (read out image data), so that the n output image data X', Y', Z' referring to a masking coefficient $[a_{ij}]$ and converted respectively match said target value data X, Y, Z. The result is stored in color correction data memory (A). From:

[output image data]=$[a_{ij}]$ [read out image data], the inverse-calculation of a masking coefficient is calculated as:

$[aid_{ij}]$=[output image data] [read out image data]$^{-1}$

For example, if the number of samples is 3 as in the following:

$$\begin{pmatrix} X_1 & X_2 & X_3 \\ Y_1 & Y_2 & Y_3 \\ Z_1 & Z_2 & Z_3 \end{pmatrix} = \begin{pmatrix} a_{11} & a_{21} & a_{31} \\ a_{21} & a_{22} & a_{32} \\ a_{31} & a_{32} & a_{33} \end{pmatrix} \begin{pmatrix} R'_1 & R'_2 & R'_3 \\ G'_1 & G'_2 & G'_3 \\ B'_1 & B'_2 & B'_3 \end{pmatrix}$$

the calculation yields:

$$\begin{pmatrix} a_{11} & a_{21} & a_{31} \\ a_{21} & a_{22} & a_{32} \\ a_{31} & a_{32} & a_{33} \end{pmatrix} = \begin{pmatrix} X_1 & X_2 & X_3 \\ Y_1 & Y_2 & Y_3 \\ Z_1 & Z_2 & Z_3 \end{pmatrix} \begin{pmatrix} R'_1 & R'_2 & R'_3 \\ G'_1 & G'_2 & G'_3 \\ B'_1 & B'_2 & B'_3 \end{pmatrix}^{-1}$$

When there are n samples such as:

$$\begin{pmatrix} X_1 & \ldots & X_n \\ Y_1 & \ldots & Y_n \\ Z_1 & \ldots & Z_n \end{pmatrix} = \begin{pmatrix} a_{11} & a_{21} & a_{31} \\ a_{21} & a_{22} & a_{32} \\ a_{31} & a_{32} & a_{33} \end{pmatrix} \begin{pmatrix} R'_1 & \ldots & R'_n \\ G'_1 & \ldots & G'_n \\ B'_1 & \ldots & B'_n \end{pmatrix}$$

$[a_{ij}]$ can not be determined uniquely. In this case, calculation is carried out by a method of least squares.

The calculated $[a_{ij}]$ is stored in color correction data memory (A). Then, the serviceman switch SWA (361) is operated again to cancel the serviceman mode.

(2-3) Image read out

In film scanner apparatus 30, when image read out is instructed by image input key 353, or when read out and print out of an image is instructed by copy key 355, the read out (read out image data R', G', B') is subjected to masking process by a masking coefficient $[a_{ij}]$ calculated and stored as described above to be provided as output image data X', Y', Z'.

(3) Specification of γ correction coefficient

FIG. 10 shows a control circuit for automatically specifying a γ correction coefficient of film scanner apparatus 30 in the image system according to an embodiment of the present invention.

Referring to FIG. 10, film scanner 30 and digital color copying machine 900 have a structure basically similar to that shown in FIG. 1 except that a γ correction circuit (A) 317 and a γ correction circuit (B) 959 for carrying out γ correction are provided in film scanner apparatus 30 and digital color copying machine 900, respectively.

Specification of a γ correction coefficient will be described hereinafter with reference to FIG. 10. This process is similar to the process of the already described masking coefficient.

More specifically, when "γ correction" is selected in the preceding screen of FIG. 8 (the screen displaying the sub-menu of masking and γ correction) to instruct inverse calculation of a γ correction coefficient, target value data $v_0$, $v_1$, ..., $v_{255}$ (target values of output image data) are transmitted along signal path 960 from the digital color copying machine 900 side to the film scanner apparatus side 30. It is assumed that target value data $v_0$, $v_1$, ..., $v_{255}$ are stored in advance as in the case of a masking coefficient.

In film scanner apparatus 30, a γ correction coefficient is calculated and stored so that the data, which is generated by applying a γ correction process to the generated read out image data $u'_0$, $u'_1$, ..., $u'_{255}$ according to a test chart (a gray scale of 256 steps) having characteristics equal to that of the digital color copying machine 900 side, matches the target value data. Referring to FIG. 10, a storage circuit is included in the γ correction circuit. The calculation method is similar to that of the masking coefficient calculation.

The system of the present embodiment has a structure as described above in which parameters of masking, γ correction and the like are adjusted.

Although the above embodiment is described in which a film scanner apparatus 30 is employed, the present invention is also applicable to a reflective type image reading apparatus.

In the present invention, when an externally provided image reading apparatus is connected to an image forming apparatus and an adjustment mode is specified by operation input and the like, the data of the image forming apparatus is fed to the externally provided apparatus to be set as the target data, whereby calibration process parameters are calculated and specified at the externally provided apparatus side. This facilitates the adjustment of calibration parameters of an externally provided image reading apparatus, and can easily correspond to the case where the printer of the connection destination is changed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image system comprising:
   a scanner for scanning an original image and generating image data; and
   a printer, detachably interfaced to said scanner by a signal transmission path, for forming an image on a print medium based on the image data transmitted from said scanner, wherein said printer comprises, a memory which stores first reference data expressing a reference image, and a transmitter which transmits said stored first reference data to said scanner by said transmission path, and said scanner comprises, a reference scanning device which scans said reference image to obtain second reference data, and a generator which generates correction data so that said second reference data corresponds to said first reference data.

2. The image system according to claim 1, wherein said scanner corrects image data obtained by scanning an original image using said correction data generated by said generator, and transmits corrected image data to said printer.

3. The image system according to claim 2, wherein said reference scanning device is a scanning unit capable of also scanning an original image to generate original image data.

4. The image system according to claim 3, wherein said correction data comprises a masking coefficient.

5. The image system according to claim 3, wherein said correction data comprises a γ correction coefficient.

6. The image system according to claim 3, wherein said printer comprises a digital color copying machine.

7. A correction method of correcting image data obtained by scanning an original image with a scanner prior to being transmitted to a printer, comprising the steps of:

coupling the scanner to the printer, the scanner being detachably interfaced to the printer by a signal transmission path, transmitting first reference data, representing a reference image, from said printer to said scanner by said transmission path, scanning said reference image in said scanner to obtain second reference data, and generating correction data in said scanner so that transmitted second reference data corresponds to said first reference data.

8. The correction method according to claim 7, further comprising the steps of:

scanning an original image in said scanner to obtain original image data, and correcting said original image data in accordance with said correction data.

9. A correction method of correcting image data transmitted from a scanner to a printer, the scanner and printer being detachably interfaced by a signal transmission path, comprising the steps of:

transmitting second reference data, representative of a reference image, from said printer to said scanner by said transmission path, scanning the reference image with said scanner to obtain first reference data, comparing said first data and said second data, and generating correction data based upon such comparison, scanning an original image with said scanner to obtain original image data, and modifying said image data in accordance with said correction data, thus generating corrected image data.

10. The correction method according to claim 9, further comprising the steps of:

transmitting said corrected image data to said printer by said transmission path, and forming an image with said printer based on said corrected image data.

* * * * *